United States Patent
Lopez et al.

(10) Patent No.: US 9,686,011 B2
(45) Date of Patent: Jun. 20, 2017

(54) CODED LIGHT EMITTING DEVICE

(75) Inventors: Toni Lopez, Eindhoven (BE); Georg Sauerlander, Eindhoven (DE)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 121 days.

(21) Appl. No.: 13/822,309

(22) PCT Filed: Sep. 8, 2011

(86) PCT No.: PCT/IB2011/053924
§ 371 (c)(1),
(2), (4) Date: Mar. 12, 2013

(87) PCT Pub. No.: WO2012/035469
PCT Pub. Date: Mar. 22, 2012

(65) Prior Publication Data
US 2013/0272716 A1    Oct. 17, 2013

(30) Foreign Application Priority Data
Sep. 14, 2010   (EP) ..................... 10176587

(51) Int. Cl.
*H04B 10/116* (2013.01)
*H04B 10/00* (2013.01)
(Continued)

(52) U.S. Cl.
CPC ....... *H04B 10/116* (2013.01); *H04B 10/1141* (2013.01); *H05B 33/0842* (2013.01); *H05B 37/0272* (2013.01)

(58) Field of Classification Search
USPC ................................ 398/127, 118
See application file for complete search history.

(56) References Cited

U.S. PATENT DOCUMENTS 7,919,936 B2 * 4/2011 Liu .................... H05B 33/0827
                                                   315/185 R
2003/0164809 A1   9/2003 Leung
(Continued)

FOREIGN PATENT DOCUMENTS

CN          101129094 A     2/2008
JP          2011116927 A    6/2011
(Continued)

OTHER PUBLICATIONS

Shchekin ["High performance thin-film flip-chip InGaN—GaN light-emitting diodes" Applied Physics Letters 89, 2006].*

*Primary Examiner* — Oommen Jacob
(74) *Attorney, Agent, or Firm* — Meenakshy Chakravorty (57) ABSTRACT

The invention relates to an illumination device for embedding data symbols of a data signal into a luminance output of the illumination device. The device includes a LED comprising at least two segments which have a common electrode and are individually controllable. The LED is configured to generate the luminance output in response to a drive signal. The device further includes a controller configured for switching one of the segments on or off in response to the data signal to embed data symbols of the data signal into the light output of the device. One advantage of such an approach is that the proposed device is compatible with conventional LED drivers since no additional electronics for modulating the drive signal are necessary, which enables simple implementation and reduced costs.

13 Claims, 5 Drawing Sheets

(51) Int. Cl.
*H04B 10/114* (2013.01)
*H05B 33/08* (2006.01)
*H05B 37/02* (2006.01)

(56) References Cited

U.S. PATENT DOCUMENTS

| | | |
|---|---|---|
| 2005/0067624 A1 | 3/2005 | Steigerwald |
| 2006/0214876 A1* | 9/2006 | Jendbro et al. ................ 345/46 |
| 2007/0024571 A1* | 2/2007 | Maniam et al. ............. 345/102 |
| 2007/0145914 A1* | 6/2007 | Hong ................ H05B 33/0815 315/291 |
| 2007/0230969 A1 | 10/2007 | Yutani |
| 2010/0013409 A1* | 1/2010 | Quek ................ H05B 33/0815 315/294 |
| 2010/0189285 A1 | 7/2010 | Niehoff |
| 2010/0289735 A1* | 11/2010 | Hosogi et al. ............... 345/102 |

FOREIGN PATENT DOCUMENTS

| | | |
|---|---|---|
| WO | WO2007129131 A1 | 11/2007 |
| WO | WO2009101570 A1 | 8/2009 |
| WO | WO2010064175 A1 | 6/2010 |

* cited by examiner

CODED LIGHT EMITTING DEVICE

FIELD OF THE INVENTION

Embodiments of the present invention relate generally to the field of illumination systems, and, more specifically, to systems and methods for embedding data into the light output of such illumination systems.

BACKGROUND OF THE INVENTION

Visible light communications refer to communicating data via the light output produced by lighting sources. Such communications is a promising way of enabling localized wireless data exchange in the future because a wide unlicensed frequency band is available for this and because light emitting diodes (LEDs) used to illuminate a room or a space can be applied to provide the communications. Possibly every lighting source of the future could become a communications source.

One visible light communications technique is based on embedding data into the light output of an illumination device by modulating the light output of the illumination device in response to a data signal (such light output is sometimes referred to as "coded light" and abbreviated as "CL"). Preferably, the light output is modulated at a high frequency and/or using a special modulation scheme so that the modulation is invisible to human beings.

Figure 1:
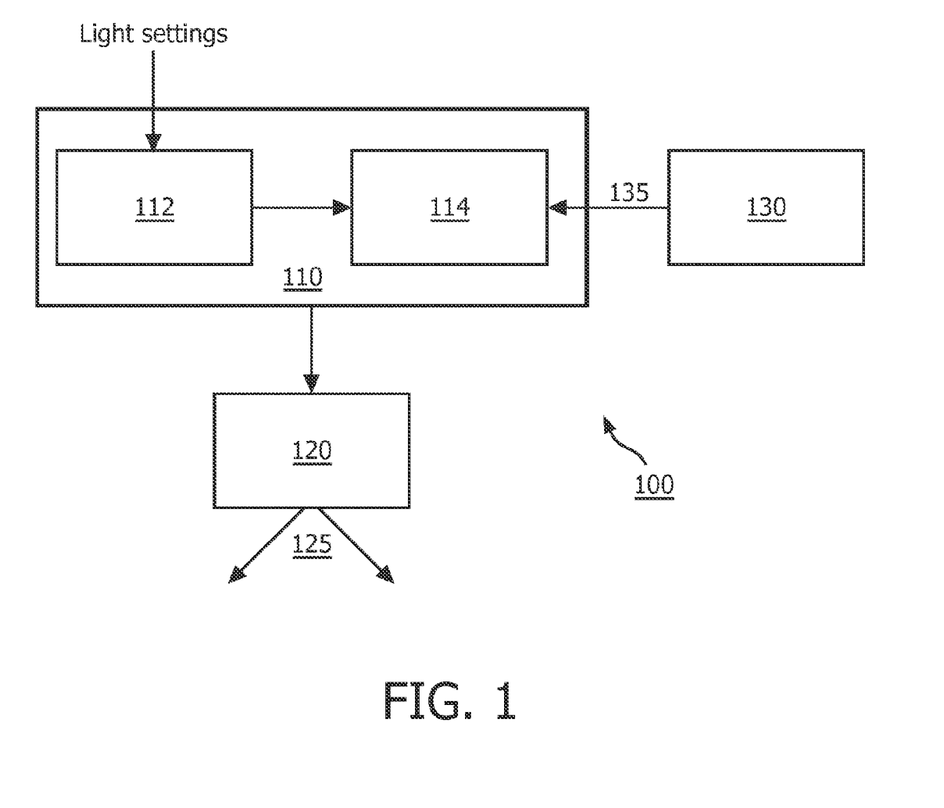
FIG. 1 is a schematic illustration of an illumination system according to prior art.

For the realization of visible light communication systems of this kind, illumination systems usually employ dedicated driver electronics to allow superimposing a data signal onto the LED driving signal. FIG. 1 is a schematic illustration of such an illumination system 100. As shown, the illumination system 100 includes a dedicated driver circuit 110 and a LED 120, and is configured to generate a light output 125 according to light settings. The dedicated driver circuit 110 includes a drive signal generator 112 and a driver controller 114. The illumination system 100 is configured to operate as follows. As shown in FIG. 1, the light settings for the illumination system 100 are provided to the drive signal generator 112. The light settings indicate what the average light output 125 should be in terms, for example, of light power, e.g. defined in lumen, and color. The drive signal generator 112 translates the light settings into a drive signal (e.g., a drive current) for the LED 120 and provides the drive signal to the driver controller 114.

The driver controller 114 is further configured to receive a signal 135 from a data source 130. The signal 135 includes data bits to be embedded into the light output 125 of the LED 120. The driver controller 114 is configured to modulate the drive signal to be applied to the LED 120 in response to the signal 135 in order to embed the data bits of the signal 135 into the light output 125. Various techniques how the drive signal could be modulated in order to embed data into the light output of a light source are known to people skilled in the art (pulse width modulation, amplitude modulation, etc) and, therefore, are not described in further detail.

One problem with such an approach is that modifying a conventional LED driver to function as the dedicated driver circuit 110 described above is complicated and costly to implement. Therefore, what is needed in the art is a technique for embedding data into a light output of a LED that does not require modulating the drive signal applied to the LED.

SUMMARY OF THE INVENTION

It is an object of the invention to provide a system and a method suitable for embedding data into the light output of a LED without modulating the drive signal provided to the LED.

According to one aspect of the invention, an illumination device for embedding one or more data symbols of a data signal into a luminance output of the illumination device is disclosed. The illumination device includes a LED comprising at least a first segment and a second segment. The first segment and the second segment have a common electrode and are individually controllable. The LED is configured to generate the luminance output in response to a drive signal. The illumination device further includes a controller configured for switching the second segment on or off in response to the data signal to embed the one or more data symbols of the data signal.

As used herein, the phrase "switch off a segment" [of a LED] refers to disrupting the drive signal provided to the segment. Similarly, the phrase "switch on a segment" [of a LED] refers to providing the drive signal to the segment. When a segment is switched off it does not generate light. When a segment is switched on, it generates light. The luminance output of the LED is a composition of the luminance outputs of each of the segments.

The present invention is based on the recognition that providing a LED separated into at least two segments having a common electrode and which are individually controllable (i.e. they can be individually switched on or off) allows varying the light output produced by the LED without having to change the drive signal supplied to the common electrode of the segments. When a drive signal is applied to the common electrode, switching off one of the segments results in the increase of the current density through the other segment which, at nominal operation, produces a degradation of the light output performance because the internal quantum efficiency (IQE) of the LED drops (this effect is commonly known as the "droop effect"). In turn, variations in the light output performance may be used to embed data symbols. In this manner, a conventional LED driver may be used to provide a drive signal to the common electrode of the two segments, while modulation of the light output is performed by switching one of the segments on and off using e.g. switches which are external to the LED driver. This approach provides an advantage over the prior art in that such a device is compatible with conventional LED drivers since no additional electronics for modulating the drive signal are necessary, which enables simple implementation and reduced costs.

As used herein, the term "nominal operation" is used to describe operation of a LED at such current density that desirably results in the maximum IQE of the LED.

The light sources described herein may comprise inorganic or organic light emitting diodes. Data embedded in the light output of the illumination system may comprise localized identification information of the light sources, their capabilities and/or settings, or other types of information related to the light sources. However, it should be noted that the illumination system is not necessarily applied for the purpose of illuminating a space or area but may also be applied for data communication as such. As an example, the illumination system may constitute an access point to a network. For such applications, at least part of the light output produced by the illumination system may lie outside of the visible spectrum (i.e., the light output of one of the light sources of the system may lie outside of the visible spectrum).

According to other aspects of the invention, a corresponding method for embedding one or more data symbols of a data signal into a luminance output of an illumination device as well as an illumination system comprising one or more illumination devices are provided.

Embodiments of claims 2, 3, 9, and 10 provide ways to define a modulation depth for the illumination device. As used herein, the term "modulation depth" refers to a range of variation in the amplitude or intensity of the luminance output of the LED, where different levels in the amplitude or intensity correspond to different data bits encoded in the luminance output.

Embodiments of claims 4, 5, 11, and 12 specify that the common electrode could be a cathode or an anode.

Embodiment of claims 6 and 13 provide an advantageous type of the LED to be employed in the illumination device.

Hereinafter, an embodiment of the invention will be described in further detail. It should be appreciated, however, that this embodiment may not be construed as limiting the scope of protection for the present invention.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 2:
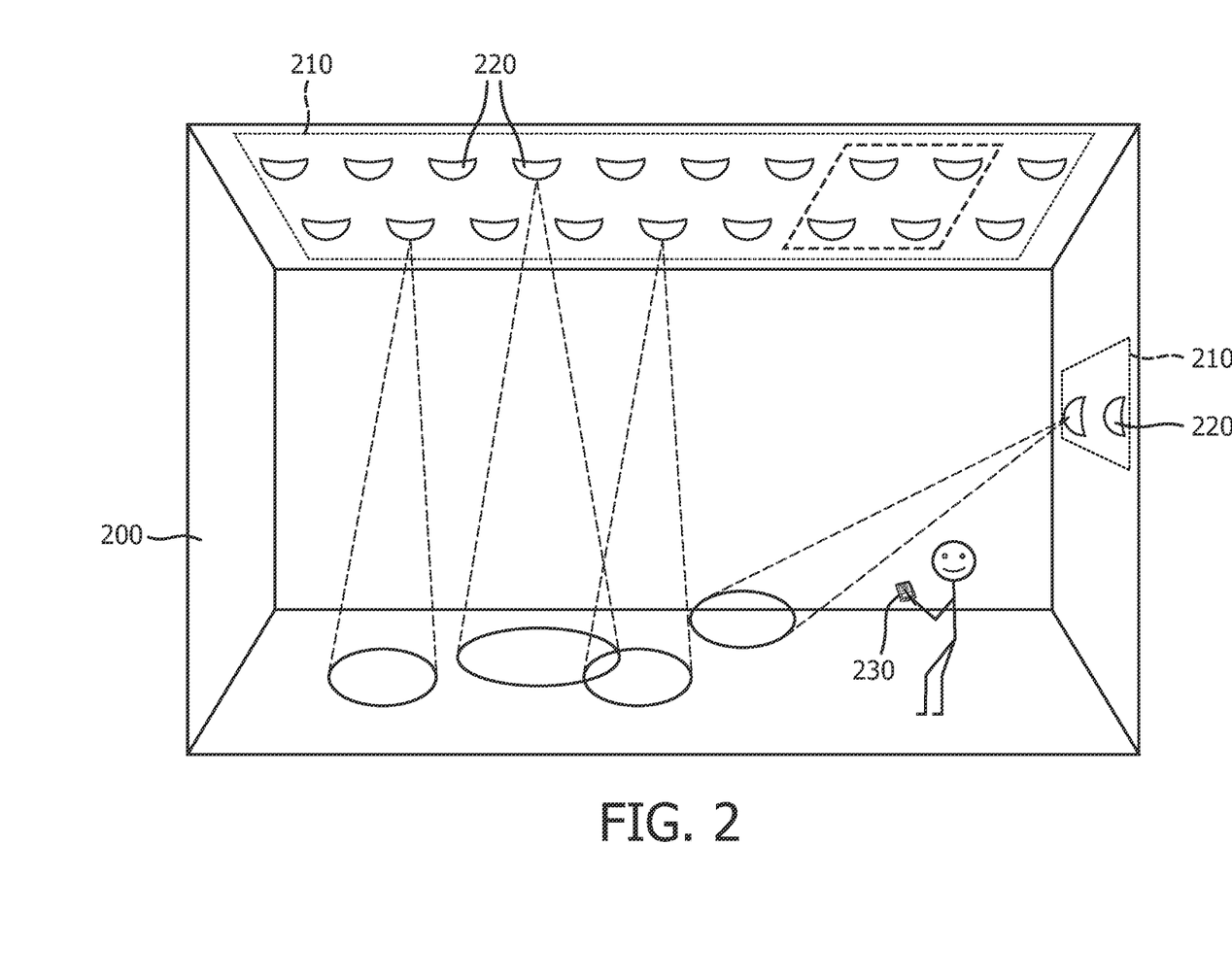
FIG. 2 is a schematic illustration of an illumination system installed in a structure according to one embodiment of the present invention.

FIG. 2 shows a structure 200—in this case a room—with an installed illumination system 210. The illumination system 210 comprises one or more of light sources 220 and one or more controllers (not shown in FIG. 1) controlling the light sources 220. When driven with an electrical signal, the light sources 220 illuminate parts of the structure 200. The light sources 220 may comprise inorganic and/or organic light emitting devices. The illumination system 210 may further comprise a remote control 230 allowing a user to control the light sources 220.

Figure 3:
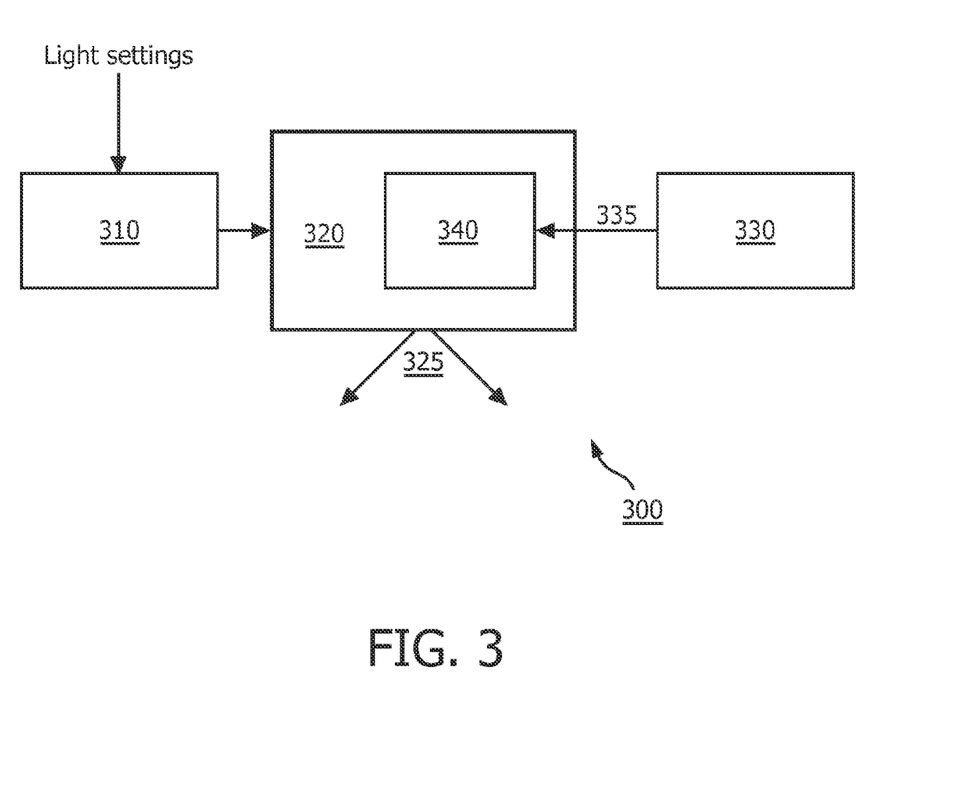
FIG. 3 is a schematic illustration of an illumination system according to one embodiment of the present invention.

FIG. 3 is a schematic illustration of an illumination system 300 according to one embodiment of the present invention. The illumination system 300 may be used as the illumination system 210 in the structure 200 illustrated in FIG. 2. As shown, the illumination system 300 includes a LED 320 which includes at least two individually controllable segments having a common electrode, a LED driver 310 configured to provide a drive signal to the LED 320, and a data source 330 configured to provide data to be embedded into the light output of the LED 320.

The illumination system 300 is configured to operate as follows. As shown in FIG. 3, the light settings for the illumination system 300 are provided to the LED driver 310. The light settings may be e.g. provided by a user via the remote control 230 or may be preprogrammed and provided from an external unit controlling the scene setting. Alternatively, the light settings may be preprogrammed and stored in a memory within the LED driver 310 or within the illumination system 300. The LED driver 310 translates the light settings into a drive signal for the LED 320.

Figure 4:
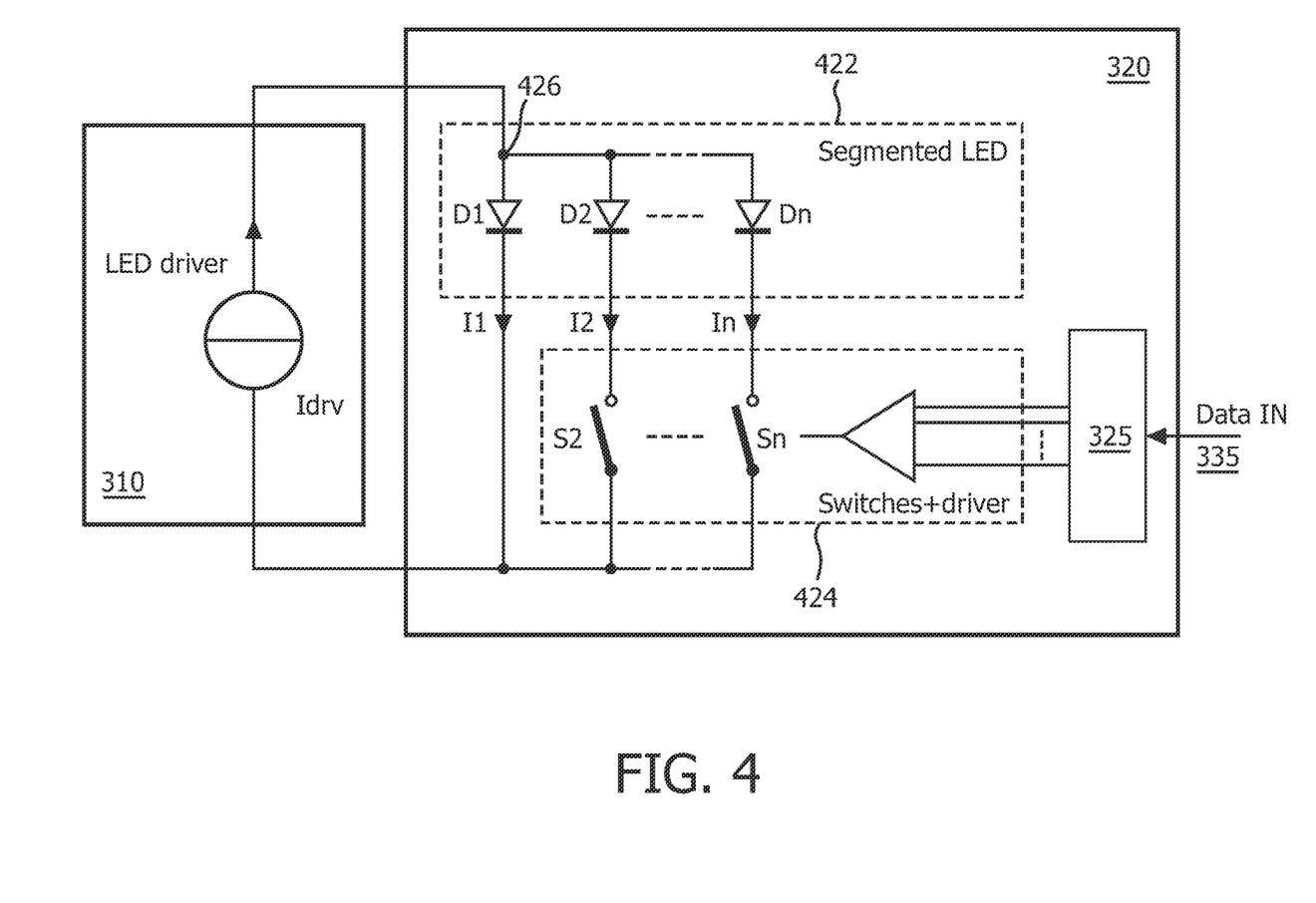
FIG. 4 is a schematic illustration of implementation of a segmented LED approach according to one embodiment of the present invention.

In one embodiment, the LED driver 310 comprises a current source providing the drive signal in the form of a drive current. In such an embodiment, the LED 320 may be implemented as illustrated in FIG. 4. As shown in FIG. 4, the LED 320 includes an emitting portion 422 and a switching portion 424. The emitting portion 422 is manufactured in such a way that n portions of the LED chip area can be partially isolated from the others, resulting in n segments, shown as D1, D2, . . . Dn, each of which is configured to emit light in response to the drive current. As used herein, n denotes any integer number equal or greater than 2. The segments D1, D2, . . . Dn have a common electrode. In FIG. 4 the common electrode is shown to be an anode 426, but, in other embodiments and with modifications to the circuit that will be apparent to the person skilled in the art, the common electrode could be a cathode.

The switching portion 424 includes (n–1) switches, shown in FIG. 4 as S2, . . . Sn, where each of the switches S2, . . . Sn is used to switch on or off a corresponding segment D2, . . . Dn of the emitting portion 422. Thus, a switch S2 corresponds to a segment D2, a switch S3 corresponds to a segment D3, and so on. When a constant drive current, shown in FIG. 4 as Idrv, is provided from the LED driver 310 and applied to the common electrode 426 and all of the switches S2, . . . Sn are closed (i.e., the corresponding circuits are closed, the corresponding segments are switched on), the currents going through each of the segments, shown in FIG. 4 as currents I1, I2, . . . In, cause the segments to emit light. The sum of light contributions from each emitting segment comprises the luminance output of the LED 320.

As used herein, the phrase "constant drive signal" (which includes "constant drive current") is used to reflect the fact that the drive signal is not modulated to embed data bits. This does not exclude drive signals consisting of pulses, as long as the pulses are not modulated to embed data signals, as was done in the prior art.

Figure 5:
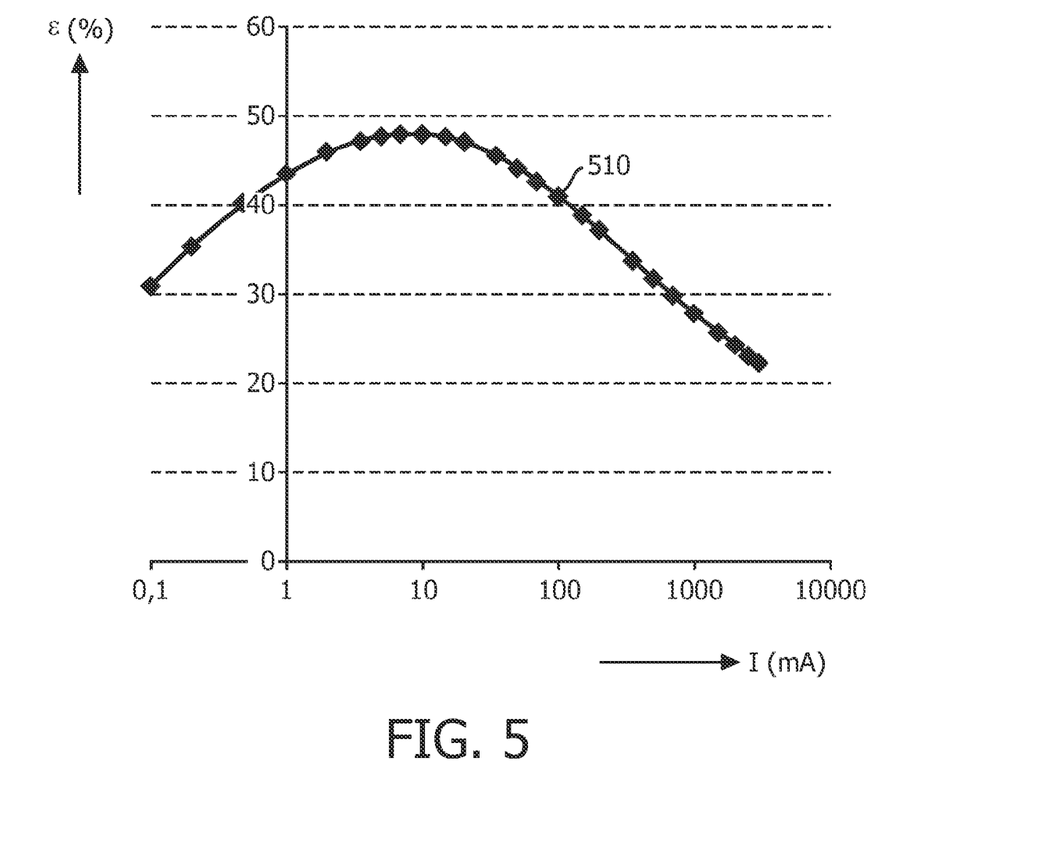
FIG. 5 is a schematic illustration of the droop effect.

Since the total drive current provided by the LED driver 310 remains constant, if one of the switches S2, . . . Sn would become open (i.e., the corresponding segment D2, . . . Dn is switched off), the current density in the segments that remain switched on would increase. Driving with the LED 320 with a nominal operation current (nominal operation here refers to all segments on), the increase in the current density through a segment after switching at least one other segment off produces a degradation in the light output performance of the emitting segment due to the droop effect. This effect is illustrated with a curve 510 in FIG. 5, where the x-axis is used to show values of the drive current (in mA), the y-axis is used to show values of the wall-plug efficiency (in %) corresponding to a commercial LED device using approximately 1 $mm^2$ of active area. The right side of the curve 510 makes clear that increase in current results in decreased efficiency.

Therefore, at nominal operation, due to the droop effect, when one of the segments D2, . . . Dn is switched off, the light output 325 produced by the LED 320 would decrease as the current density through the other segments increase. In order to utilize this effect, as shown in FIGS. 3 and 4, the LED 320 further includes a controller 340. The controller 340 is configured to receive a data signal 335 from a data source 330. The signal 335 includes (at least) data bits to be embedded into the light output 325 of the LED 320. In the present description, the symbols are referred to as bits. However, it should be recognized that whenever the word "bit" is used in the present application, a wider definition of a "symbol" applies which may also comprise multiple bits represented by a single symbol. For instance multi-level symbols, where not only 0 and 1 exist to embed data, but multiple discrete levels are defined to represent data.

The controller 340 is configured to switch segments D2, . . . Dn on or off in response to the signal 335 in order to embed the data bits of the signal 335 into the light output 325. The amount of emitting area corresponding to each of the different segments defines the intensity levels of the light output modulation. The number of segments that can be switched on or off defines the number of modulation levels. For example, for a two level modulation (i.e. each bit to be embedded is either "1" or "0"), only two segments within the LED 320 are required—one segment which is always switched on and another segment which could be switched on or off to embed data bits. Referring to FIG. 4, such an embodiment corresponds to the emitting portion 422 comprising only two emitting segments, D1 and D2. Continuing with this example, consider that decreasing the light output of the LED 320 by 10% can be resolved on the detecting side as a binary value of "0". In such an exemplary embodiment, the size of the segment D2 may be made to be approximately 10% of the total area of the emitting portion 422 and to embed a binary value of "0" from the signal 335, the controller 340 would switch segment D2 off (i.e., open the corresponding switch S2).

Persons skilled in the art will recognize other methods for switching the segments on and off in dependence of the signal 335 to embed data into light output of the illumination system. For example, multi-level modulation of the light output could be implemented by employing and switching larger number of segments than two. The larger the number of levels is, the higher the bit rate can get. Thus, in another embodiment, the emitting portion 422 comprises the segments D1 . . . Dn. In practice n is an integer between 3 and 10, more preferably between 5 and 8, such as 6 or 7. Switching the segments D2 . . . Dn using the switches S2 . . . Sn enables implementing data with multiple discrete levels in the light output 325 of LED 320. In an embodiment the relative sizes A2 . . . An of the segments D2 . . . Dn are all equal. In another embodiment the relative sizes A2 . . . An are related to each other in a predefined relationship such that they continuously increase/decrease. For instance, $An-1=2\times An$, so that $A2=2\times A3=2\times(2\times A4)=2\times(2\times(2\times A5))$, etc. In another embodiment the segments D2 . . . Dn are designed such that their nominal operation current densities relate to each other similarly as described for the sizes above.

In addition to operation in the mode where the controller 340 switches some of the segments on and off to embed data symbols of the data signal 335, which could be referred to as a "transmission mode," the LED 320 could also operate in DC mode as any other conventional LED device when switches S2-Sn remain in on-state. Namely, the current through the segments D1, D2, . . . Dn will flow uniformly provided that the on-resistance of the switches S2, . . . Sn is much lower than the dynamic resistance of the segments.

Furthermore, in other embodiments, the LED driver 310 may comprise a voltage source providing the drive signal in the form of a drive voltage. Persons skilled in the art will readily recognize how the discussions provided above could be modified to accommodate the voltage source LED driver.

One advantage of the present invention is that the drive signal provided by the LED driver to the LED does not need to be modulated to embed the data symbols because the data symbols are embedded via switching of the individual segments of the LED. As a result, conventional LED drivers may be employed, eliminating the need to include complicated and costly electronics capable of modulating the drive signal.

While the forgoing is directed to embodiments of the present invention, other and further embodiments of the invention may be devised without departing from the basic scope thereof. For example, aspects of the present invention may be implemented in hardware or software or in a combination of hardware and software. Therefore, the scope of the present invention is determined by the claims that follow.

The invention claimed is:

1. An illumination device for embedding one or more data symbols of a data signal into a luminance output of the illumination device, the device comprising:
   a light emitting diode comprising at least a first segment and a second segment, wherein the first segment and the second segment have a common electrode and are individually controllable and the light emitting diode is configured to generate the luminance output in response to a drive signal into which light settings are translated to control said luminance output in accordance with said light settings; and
   a controller configured for switching the second segment on or off in response to the data signal to form, in said luminance output, coded light embedded with the one or more data symbols of the data signal while the drive signal is constant and is supplied to said common electrode, wherein a modulation depth is proportional to the size of at least one of the first segment and the second segment.

2. An illumination device for embedding one or more data symbols of a data signal into a luminance output of the illumination device, the device comprising:
   a light emitting diode comprising at least a first segment and a second segment, wherein the first segment and the second segment have a common electrode and are individually controllable and the light emitting diode is configured to generate the luminance output in response to a drive signal into which light settings are translated to control said luminance output in accordance with said light settings; and
   a controller configured for switching the second segment on or off in response to the data signal to form, in said luminance output, coded light embedded with the one or more data symbols of the data signal while the drive signal is constant and is supplied to said common electrode, wherein a modulation depth is proportional to a current density through at least one of the first segment and the second segment.

3. The illumination device according to claim 1, wherein the common electrode comprises a cathode.

4. The illumination device according to claim 1, wherein the common electrode comprises an anode.

5. The illumination device according to claim 1, wherein the light emitting diode comprises a thin-film flip-chip device.

6. An illumination system comprising one or more illumination devices according to claim 1.

7. A method for embedding one or more data symbols of a data signal into a luminance output of a light emitting diode, the method comprising:

providing a drive signal to the light emitting diode comprising at least a first segment and a second segment, wherein the first segment and the second segment have a common electrode and are individually controllable and the light emitting diode is configured to generate the luminance output in response to a drive signal into which light settings are translated to control said luminance output in accordance with said light settings; and switching the second segment on or off in response to the data signal to form, in said luminance output, coded light embedded with the one or more data symbols of the data signal while the drive signal is constant and is supplied to said common electrode, wherein a modulation depth is proportional to a current density through at least one of the first segment and the second segment.

8. A method for embedding one or more data symbols of a data signal into a luminance output of a light emitting diode, the method comprising:

providing a drive signal to the light emitting diode comprising at least a first segment and a second segment, wherein the first segment and the second segment have a common electrode and are individually controllable and the light emitting diode is configured to generate the luminance output in response to a drive signal into which light settings are translated to control said luminance output in accordance with said light settings; and switching the second segment on or off in response to the data signal to form, in said luminance output, coded light embedded with the one or more data symbols of the data signal while the drive signal is constant and is supplied to said common electrode, wherein a modulation depth is proportional to the size of at least one of the first segment and the second segment.

9. The method according to claim 7, wherein the common electrode comprises a cathode.

10. The method according to claim 7, wherein the common electrode comprises an anode.

11. The method according to claim 7, wherein the light emitting diode comprises a thin-film flip-chip device.

12. The illumination device according to claim 1, wherein said switching is implemented independently of said drive signal.

13. The method according to claim 7, wherein said switching is implemented independently of said drive signal.

* * * * *